(12) United States Patent
Pelletta et al.

(10) Patent No.: US 6,848,479 B2
(45) Date of Patent: Feb. 1, 2005

(54) DYNAMO-ELECTRIC MACHINE COMPONENT CORE WINDING METHODS AND APPARATUS

(75) Inventors: Massimo Pelletta, Viguzzolo (IT); Gianpiero Vanzetti, Collegno (IT); Gianfranco Stratico, Siena (IT)

(73) Assignee: Axis USA, Inc., Tampa, FL (US)

( * ) Notice: Subject to any disclaimer, the term of this patent is extended or adjusted under 35 U.S.C. 154(b) by 18 days.

(21) Appl. No.: 10/293,387

(22) Filed: Nov. 12, 2002

(65) Prior Publication Data

US 2003/0136871 A1 Jul. 24, 2003

Related U.S. Application Data

(60) Provisional application No. 60/334,472, filed on Nov. 16, 2001, and provisional application No. 60/333,498, filed on Nov. 28, 2001.

(51) Int. Cl.$^7$ ................................................. B21F 3/00
(52) U.S. Cl. ................................................. 140/92.2
(58) Field of Search ............................... 140/92.1, 92.2

(56) References Cited

U.S. PATENT DOCUMENTS

| | | | |
|---|---|---|---|
| 3,636,990 A | 1/1972 | Eminger et al. | ............ 140/92.1 |
| 4,512,376 A | 4/1985 | Barrera | ....................... 140/92.1 |
| 5,076,508 A | 12/1991 | Arnold et al. | ................. 29/596 |
| 5,845,392 A | 12/1998 | Cardini et al. | ................. 29/736 |
| 5,881,778 A | 3/1999 | Barrera | ....................... 140/92.2 |
| 6,386,243 B1 | 5/2002 | Bonnacorsi et al. | ........ 140/92.2 |
| 6,536,094 B2 | 3/2003 | Bonnacorsi et al. | ........... 29/596 |

FOREIGN PATENT DOCUMENTS

EP  0 818 874 A1  1/1998  .......... H02K/15/06

*Primary Examiner*—Lowell A. Larson
(74) *Attorney, Agent, or Firm*—Fish & Neave LLP; Robert R. Jackson; Patrick J. Zhang

(57) ABSTRACT

The present invention concerns improved methods and apparatus for forming undulated wire coils that are placed into the cores of dynamo electric machine components. In particular, the invention concerns improved methods and apparatus for controlling the direction of deposit (along the axis about which the coil is wound) for the turns of a wire coil and for positioning the leads of the coil. This is accomplished by forming a series of wire coils using a programmable apparatus that controls a sequence of directions (along the coil axis) in which the wire turns are deposited, as well as positions of the final leads. The same methods and apparatus may also be used to form continuously wound wire portions.

13 Claims, 6 Drawing Sheets

DYNAMO-ELECTRIC MACHINE COMPONENT CORE WINDING METHODS AND APPARATUS

CROSS REFERENCE TO RELATED APPLICATIONS

This application claims priority from U.S. provisional application No. 60/334,472, filed Nov. 16, 2001, and U.S. provisional application No. 60/333,498, filed Nov. 28, 2001, which are hereby incorporated by reference in their entireties.

BACKGROUND OF THE INVENTION

The present invention concerns improved methods and apparatus for forming undulated wire coils that are placed into the cores of dynamo electric machine components. In particular, the invention concerns improved methods and apparatus for controlling the direction of deposit for the turns of a wire coil and for positioning the leads of the coil. "Direction of deposit" refers to the direction that winding proceeds along the axis about which the coil is wound. "Direction of deposit" does not refer to whether wire is deposited going clockwise or counter-clockwise about the just-mentioned axis. Rather, "direction of deposit" refers to which direction along (i.e., substantially parallel to) the just-mentioned axis successive turns of wire are deposited as winding proceeds. The general background of the invention is provided in Barrera U.S. Pat. No. 5,881,778, and Bonnacorsi et al. U.S. Pat. No. 6,386,243, which are hereby incorporated by reference herein in their entireties.

Selective positioning of wire leads in a coil is generally done to protect the leads from interfering with operation and becoming damaged. For example, the leads may be selectively positioned away from a portion of the core that will be adjacent to a relatively moving component in the finished and operating dynamo-electric machine. According to the prior art, such positioning is generally achieved by controlling the final lead of the wire to produce a desired position for the lead when placed within the coil. Conventionally, a single layer of coils placed at the radially innermost portion of the core may have selectively positioned wire leads that are placed away from the center of the core.

One method for reducing the opportunity for interference from wire leads is to reduce their frequency within the core. To this end, multiple wire coil portions may be formed from a continuous wire segment that has only a single initial lead and a single final lead. In the prior art, each coil portion is formed by winding wire turns in a single direction of deposit, with the resulting coil having an initial lead and a final lead at radially opposite locations when placed on the core. This arrangement of the wire leads in the continuous wire portions produces similar interference problems as in the independent wire coils, where the wire leads are exposed to the radially inner aperture and the radially outer contour of the core.

SUMMARY OF THE INVENTION

In view of the foregoing, it is an object of the present invention to provide improved methods and apparatus for controlling the direction of deposit for wire turns in a sequence of wire coils or continuous coil portions. (Again, as stated earlier, "direction of deposit" refers to the direction that winding proceeds along the axis about which the coil is wound. This axis is sometimes referred to as the "coil axis.") It is a further object of the present invention to provide improved methods and apparatus for selectively positioning the wire leads of the same.

This and other objects are accomplished by forming a series of wire coils or continuous coil portions using a programmable apparatus that controls a sequence of directions along the coil axis in which the wire turns are to be deposited, as well as a corresponding sequence of positions for the final wire leads.

In the illustrative embodiment, the apparatus grips an initial lead of the first wire coil in a sequence at a first location on the forming structure. The wire turns of the first coil are deposited in a direction along the coil axis away from the initial lead. After depositing the final turn of the first coil, the final wire lead is returned to a position along the coil axis corresponding to the initial wire turn adjacent to the initial lead. Similarly, an initial lead of the final coil in the sequence may be gripped at a second location opposite to the first location on the forming structure. In the final coil, the wire turns are deposited in a direction along the coil axis opposite the wire turns of the first coil toward the first position. The series of wire coils resulting from this programmed forming process has wire leads that are each surrounded by the bridge portions of adjacent coils. (The "bridge portions" of coils are the portions that remain outside the core at the axial ends of the core.) The leads are thereby protected from both the radially inner aperture and the radially outer contour of the core.

Similarly, the illustrative apparatus may be used to form continuous coil portions from a continuously wound wire. A first coil portion may be formed on the forming structure with the wire turns deposited in a first direction along the coil axis. The first coil portion may then be removed from the forming structure and another coil portion may be formed with the wire turns deposited in a second opposite direction along the coil axis. The final lead may be selectively positioned at a level (i.e., location along the coil axis) corresponding to any of the wire turns in the second coil portion. The resulting continuous wire portions have only one initial lead and one final lead, where at least the initial lead is positioned away from the inner aperture of the core on which the wire is ultimately deposited.

BRIEF DESCRIPTION OF THE DRAWINGS

The advantages of the invention will be apparent upon consideration of the following detailed description, taken in conjunction with the accompanying drawings, in which like reference characters refer to like parts throughout, and in which.

DETAILED DESCRIPTION OF THE PREFERRED EMBODIMENTS

Figure 1:
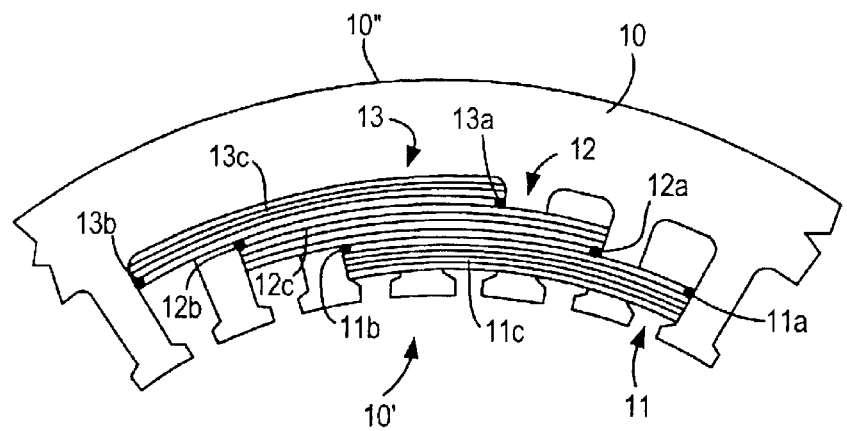
FIG. 1 is a schematic view of a representative portion of a component core 10 showing the positions of the wire leads accomplished in accordance with the invention.

FIG. 1 shows a component core with a plurality of wire coils placed within. With reference to radially innermost coil 11, initial lead 11a and final lead 11b have bridge portion 11c between themselves and opening 10' of the core in directions that are radial of core 10. Middle coil 12 may have initial lead 12a and final lead 12b positioned in the traditional manner with initial lead 12a and final lead 12b on either side of bridge portion 12c in directions that are radial of core 10, and with initial lead 12a more radially internal towards opening 10' than final lead 12b.

With respect to radially outermost coil 13, initial lead 13a and final lead 13b have bridge portion 13c between themselves and the external contour 10" of the component core in directions that are radial of core 10. The existence of bridge portion 13c between leads 13a and 13b and the external contour 10" of the core makes leads 13a and 13b less subject to the undesirable effect of being bent outwards beyond the external contour of the core.

Figure 2:
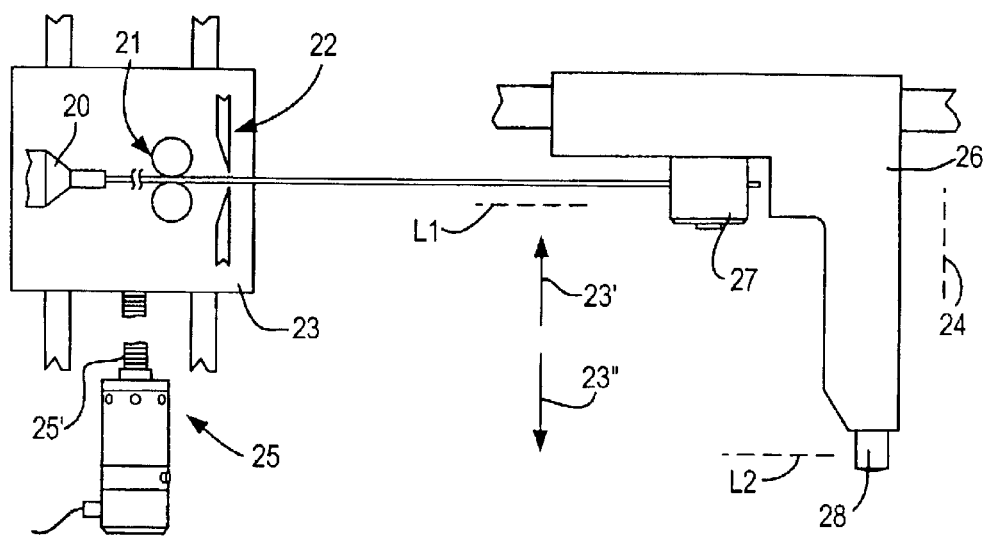
FIG. 2 is a schematic view of portions of an illustrative embodiment of apparatus in accordance with the invention.

FIG. 2 shows wire nozzle 20, feed device 21, and cutters 22, all of which may be mounted on support plate 23 according to the invention. Support plate 23 may be capable of translating in upward direction 23' and downward direction 23". There are two (opposite) directions along the axis of a coil that will be wound on the forming structure (including forming member 26) as will be described below. Both of these directions are parallel to vertical axis 24, which may be the rotational axis of the support head (not shown) that operates to form the polygonal and undulated configurations of the coils. Axis 24 may be thought of as the above-mentioned coil axis.

Position controlled motor unit 25 may be used to rotate a screw/bush assembly 25' that drives the translation of support plate 23 in directions 23' and 23". The motion of support plate 23 in directions 23' and 23" may be programmable through controlled motor unit 25 to fulfill required position appointments in time and as a function of the rotational angular position of the support head about axis 24. There may be controlled synchronization between the rotation of the support head and the translation of slide 23 in directions 23' and 23".

According to the present invention, forming member 26, which may be one of the forming members assembled in an annular array about axis 24 of the before-mentioned support head, may be provided with grippers 27 and 28 for holding the initial leads of the coils (e.g., leads 11a, 12a, and 13a shown in FIG. 1). Gripper 27 is located in upper plane L1 of the forming member, and gripper 28 is located in lower plane L2 of the forming member. Grippers 27 and 28 may be capable of gripping the initial lead fed from wire nozzle 20, rotating during rotation of the support head to bring the initial lead tangent to a side of the polygonal wire configuration defined by the annular array of forming members 26, and rotating during the formation of the undulated configuration.

FIGS. 3–8 show the illustrative apparatus in various operational stages for winding each of the series of coils 11, 12, and 13 shown in FIG. 1. It should be mentioned that all of these FIGS., and indeed all of the FIGS. herein that are like FIG. 2, are somewhat schematic. Thus, these FIGS. do not accurately reflect the fact that motor unit 25 is typically stationary in the vertical direction relative to forming members 26. In other words, these FIGS. do not accurately show that the vertical spacing between elements 23 and 25 changes as motor unit 25 operates. It should also be mentioned that although the following discussion tends to imply that coils 11–13 are wound in that order, the opposite order (13 first, then 12, then 11) can be used instead, if desired. The order in which the coils are wound can depend on the nature of the apparatus used to subsequently insert the coils in core 10. If that apparatus is capable of inserting all three coils substantially simultaneously, then the coils can be wound in the order 11, 12, 13. But if the insertion apparatus is of the type that inserts each coil as it is wound, then the coils are typically wound in the order 13, 12, 11.

Figure 3:
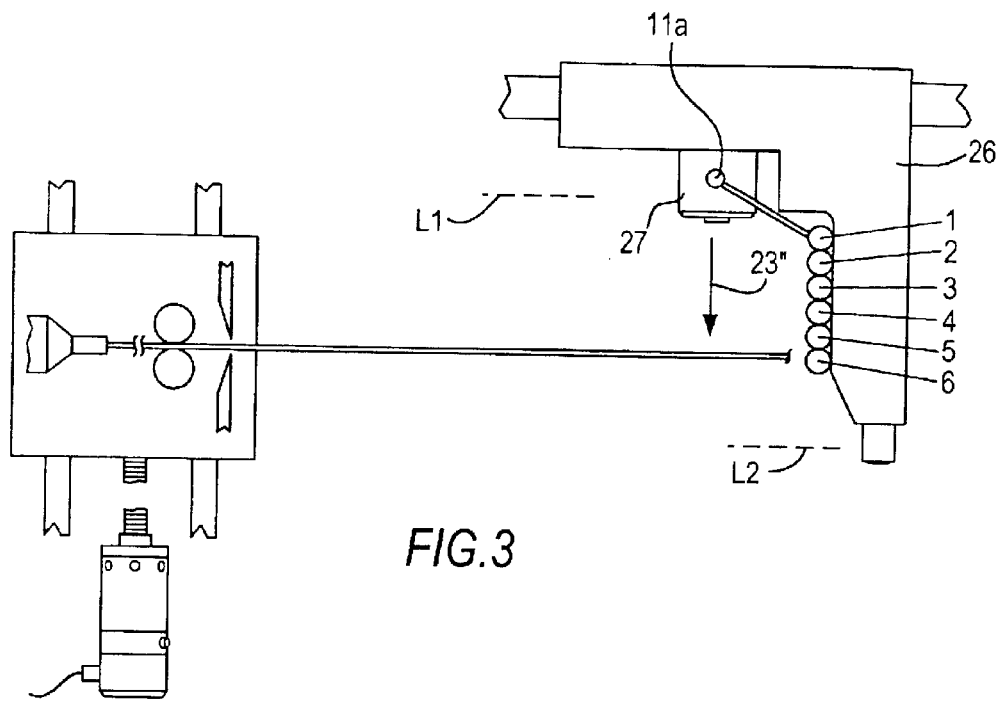
FIG. 3 is similar to FIG. 2 and shows the formation of a wire coil by gripping an initial lead with upper gripper 27 and winding wire turns 1 to 6 progressively away from the initial lead along the coil axis in accordance with the invention.

FIG. 3 shows coil 11 being started by gripping initial lead 11a with gripper 27. Wire turns 1 to 6 of coil 11 may then be progressively formed according to an order in time represented by the numbering 1 to 6 (i.e., starting from turn number 1 and gradually moving down along to coil axis to end with turn number 6).

As shown in FIG. 3, the formation of wire turns 1 to 6 may be obtained by rotating the support head (including forming members 26), after initial lead 11a has been gripped by gripper 27, to draw wire from nozzle 20. In FIG. 3, gripper 27 is shown rotated to bring initial lead 11a tangent to a side of the polygonal configuration of the wire coil formed by rotation of the support head around axis 24. The wire turns 1 to 6 are consecutively drawn onto forming members 26 to form the polygonal shape that is required before forming the wire coil into the undulated configuration. During rotation of the support head to form the wire turns into the polygonal configuration, slide 23 is progressively moved in downward direction 23" along the coil axis to position turns 1 to 6 along forming members 26. In other words, this gradual, relative downward movement of slide 23 causes the wire to be deposited on forming members 26 in a vertically oriented helix (albeit a helix that has a polygonal annular shape). The successive turns of the wire in this helix are approximately in respective planes that are parallel to one another and approximately perpendicular to vertical axis 24 (the coil axis).

To summarize the foregoing again, the result of moving slide 23 in the manner described above is to progressively align wire nozzle 20 with predetermined positions distributed vertically along forming members 26 and consequently to achieve positioning of the wire turns in the predetermined vertically distributed positions. The wire turns should result according to the formation shown in FIG. 3, where the turns are positioned in a descending order vertically along forming members 26 without surmounting (i.e., radially overlapping) each other. In this way, later insertion of the coil into the slots of the core will be achieved more smoothly and with less risk of jamming that may be caused by wire turns that surmount each other, and that do not run properly within the predefined core slots.

To achieve the wire turn formation shown in FIG. 3, slide 23 may be moved in downward direction 23" along the coil axis in increments substantially equal to the diameter of the wire used to form the turns. If multiple wires are drawn simultaneously from wire nozzle 20 to form the coils and the leads, slide 23 may be moved in downward direction 23" in increments that are a corresponding multiple of the wire diameter. The incremental movements of slide 23 may be effected as a predetermined function of the angular rotation of the support head.

By positioning the wire turns using the movement of slide 23, forming members 26 do not require the surface inclination traditionally used to shift the wound turns downward as new wire is drawn onto the forming members by rotation of the support head.

Figure 4:
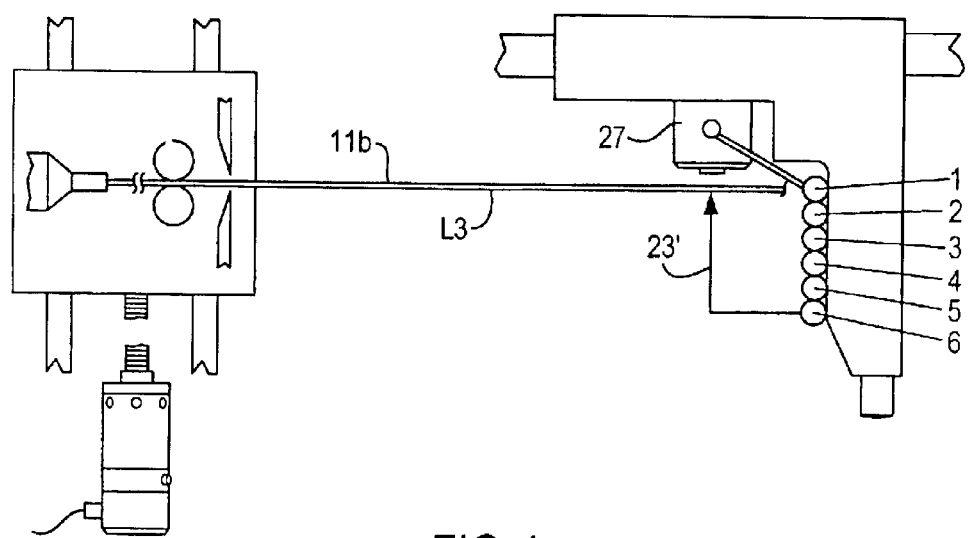
FIG. 4 is again similar to FIG. 2 and shows a later stage in the operation following the formation of wire turn 6 in FIG. 3 in which the final lead is positioned adjacent the initial lead along the coil axis in accordance with the invention.

FIG. 4 shows the apparatus at a time following the formation of the wire turns shown in FIG. 3. FIG. 4 shows the positioning of final lead 11b after turn 6 is wound onto forming members 26. Particularly, slide 23 is moved upwards in direction 23' along the coil axis to level L3, just below level L1, in order to satisfy the radial position assignment shown in FIG. 1 when the coil is placed within the core. After the instant shown in FIG. 4, final lead 11b may be cut and the undulated configuration may be formed.

The upward movement of slide 23 in direction 23", as shown in FIG. 4, should take place during a sufficient portion of the support head rotation so that the ascent of slide 23 to reach level L3 produces a climbing wire that gradually crosses the turns already formed on forming members 26. This will avoid an excessive surmount of the climbing wire over turns 1 to 6 in a local angular area around the coil, thereby enabling smoother insertion of the coil into the core later.

Figure 5:
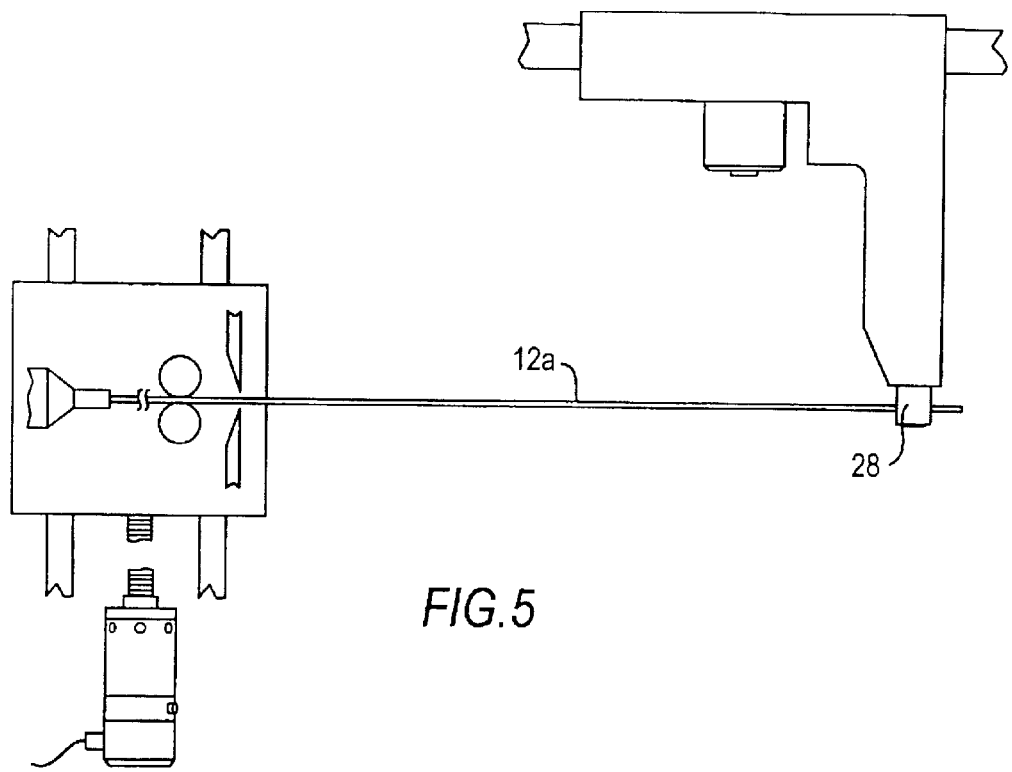
FIG. 5 is again similar to FIG. 2 and shows the initial lead of a wire being gripped with lower gripper 28 at an opposite end of the forming structure in accordance with the invention.
Figure 6:
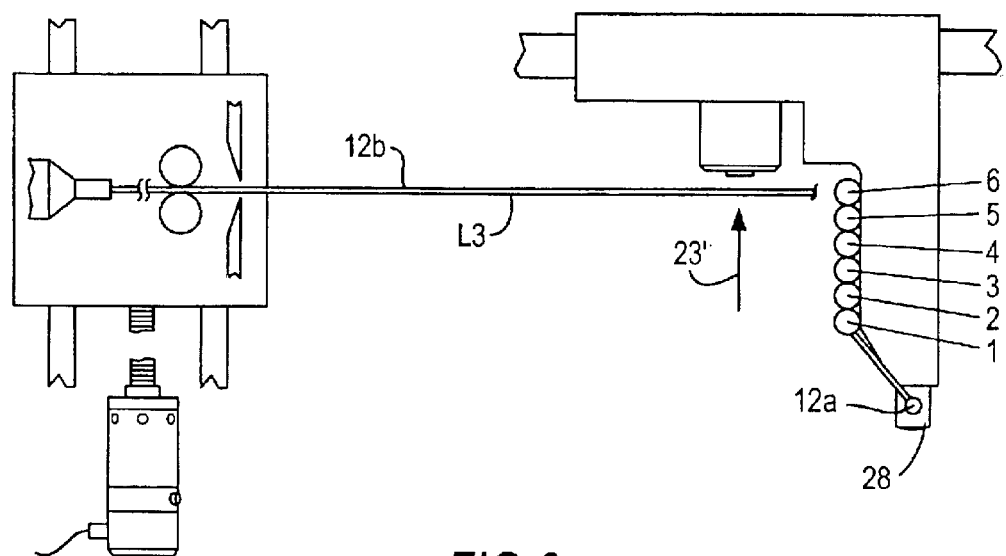
FIG. 6 is again similar to FIG. 2 and shows an operational sequence in which the wire coil is being formed by depositing wire turns 1 to 6 in a direction along the coil axis opposite to the direction of deposit shown in FIGS. 3 and 4 in accordance with the invention.

FIGS. 5 and 6 show the illustrative apparatus during operational sequences for winding coil 12 and for positioning initial lead 12a and final lead 12b into the radial positions assigned to them in FIG. 1. In this case, initial lead 12a is gripped by lower gripper 28 and slide 23 thereafter gradually moves in upward direction 23' along the coil axis to achieve the ascending order of turns 1 to 6 shown in FIG. 6. Vertical translation of slide 23 after the formation of the turns is not necessary because final lead 12b is formed at level L3 to achieve the position requirement shown in FIG. 1.

Figure 7:
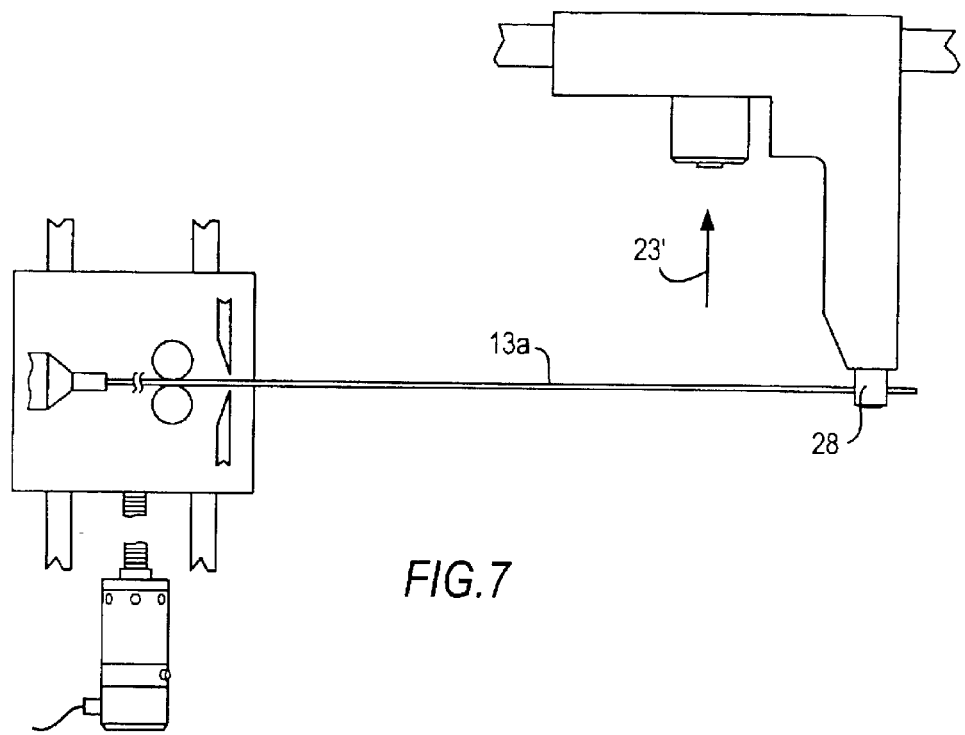
FIG. 7 is again similar to FIG. 2 and shows gripping of the initial lead with lower gripper 28 before the winding of wire turns in direction 23' along the coil axis in accordance with the invention.
Figure 8:
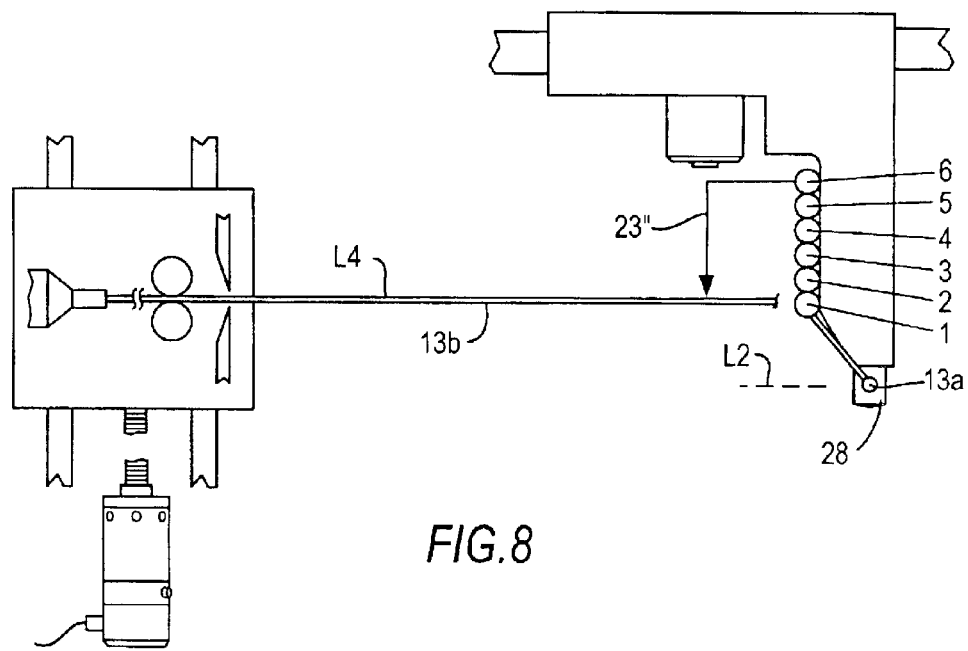
FIG. 8 is again similar to FIG. 2 and shows the an operational sequence in which the wire turns 1–6 have been deposited in direction 23' (FIG. 7) and the final lead has been moved in direction 23" along the coil axis to a position adjacent the initial lead in accordance with the invention.

FIGS. 7 and 8 show the illustrative apparatus during operational sequences for winding coil 13 and for positioning initial lead 13a and final lead 13b. In this case, initial lead 13a is gripped by lower gripper 28, and slide 23 thereafter gradually moves in upward direction 23' along the coil axis to achieve the vertically ascending order of turns 1 to 6 shown in FIG. 8. Following the formation of turn 6, slide 23 is moved in downward direction 23" along the coil axis to position final lead 13b at level L4 just above level L2 of gripper 28. In this way, initial lead 12a and final lead 12b will be properly positioned in the position assignments shown in FIG. 1. Similar to the formation process of coil 11, the movement of slide 23 to position final lead 13b should occur as an appropriate function of the support head rotation so as to allow the descending wire to cross the previously formed turns 1 to 6 along a sufficiently ample angular distance around the coil.

In view of the foregoing, a series of coils (e.g., coils 11, 12, and 13) are formed in sequence by programmable apparatus that controls the position appointments of vertically translating slide 23 and rotating forming members 26. The apparatus controls the vertical positioning of the wire turns and of the wire leads for each coil being formed. The resulting series of coils has each initial and final lead surrounded by the bridge portions (e.g., 11c, 12c, 13c) of adjacent wire coils when placed into the core. Further, the wire leads in the series of coils are exposed to neither the radially inner opening nor the radially outer contour of the core.

Another approach to reducing the opportunity for interference from wire leads is to reduce their frequency in the core. One such approach uses multiple coil portions formed from a continuous wire, where the resulting continuous coil portions have only a single initial lead and a single final lead. A method for forming two phase-shifted, continuous half-coils is discussed in before-mentioned and incorporated Barrera U.S. Pat. No. 5,881,778.

Figure 9:
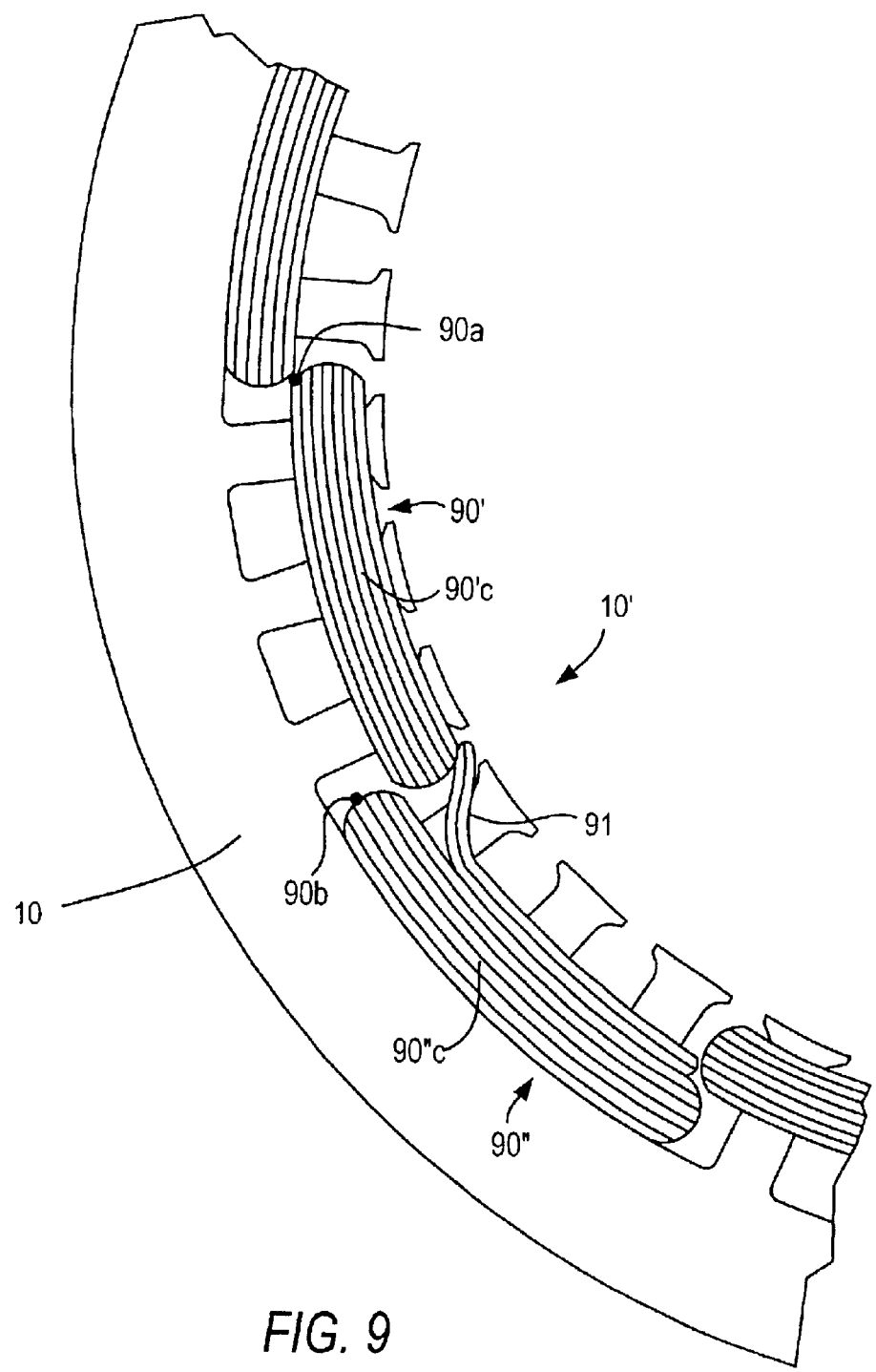
FIG. 9 shows a representative portion of a component core having two continuous coil portions with wire leads positioned in accordance with the invention.

FIG. 9 shows a component core 10 with illustrative half coils placed therein that resulted from an exemplary method of the invention. The half coils of other phases that would be present in core 10 have been omitted for sake of clarity. As shown in FIG. 9, half coils 90' and 90" are joined by connection loop 91 and has initial lead 90a at the beginning of half coil 90', and final lead 90b at the end of half coil 90". Initial lead 90a and final lead 90b are positioned so that bridging portions 90'c and 90"c act as barriers toward radially inner opening 10' for the same reasons relating to the positioning of leads 11a and 11b in FIG. 1. Note that in FIG. 9, loop 91 is shown as including two wires (because in this illustrative example the windings have been made by depositing two wires simultaneously, side by side, from a single wire dispenser). If the windings had instead been made using only a single wire emanating from the wire dispenser, loop 91 would only be a single wire.

Figure 10:
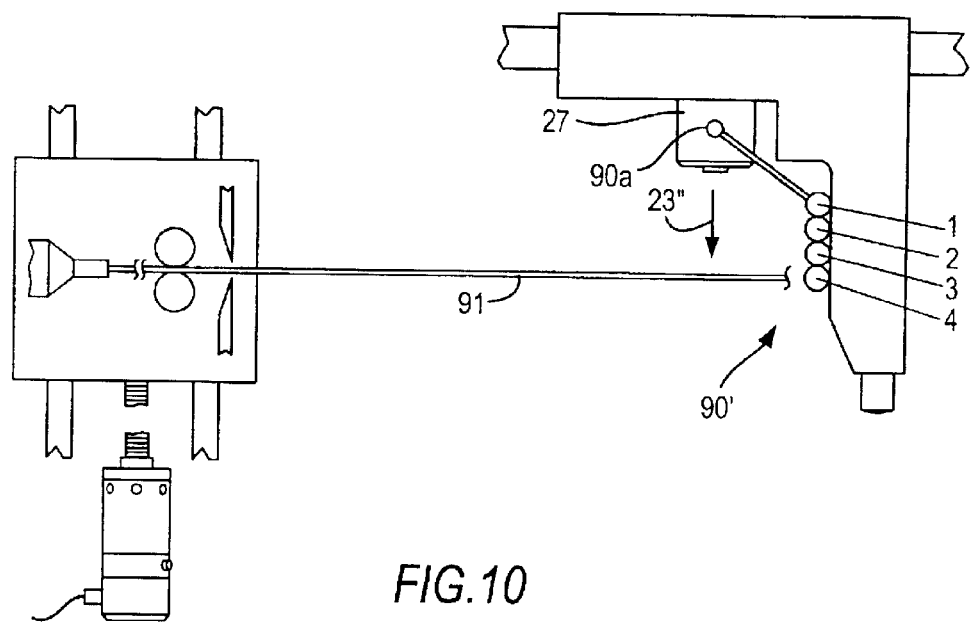
FIG. 10 is again similar to FIG. 2 and shows the illustrative apparatus depositing the wire turns of the first coil portion in direction 23" along the coil axis in accordance with the invention.
Figure 11:
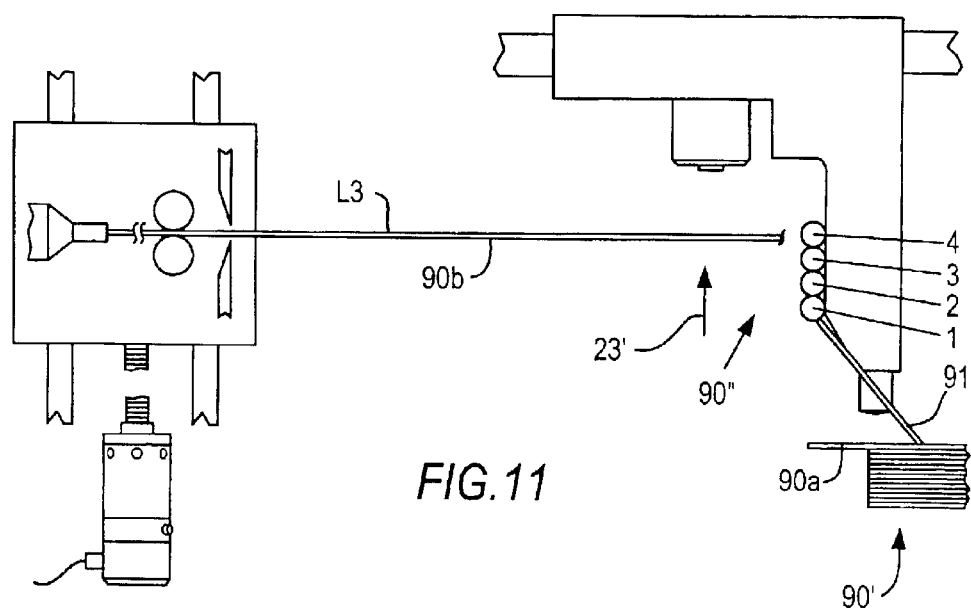
FIG. 11 is again similar to FIG. 2 and shows the illustrative apparatus, after the removal of the first coil portion (as in FIG. 10) from the forming structure, depositing the wire turns of the second coil portion in opposite direction 23' along the coil axis to achieve advantageous lead positioning in accordance with the invention.

FIGS. 10 and 11 show the illustrative apparatus during operational stages for winding half coils 90' and 90". With reference to FIG. 10, half coil 90' is first wound by gripping initial lead 90a with upper gripper 27 and thereafter gradually moving slide 23 in downward directions 23" along the coil axis during rotation of the support head. This process forms successive wire turns 1 to 4 as shown in FIG. 10. As shown in FIG. 11, half coil 90' is stripped from forming members 26 and placed on an insertion tool (not shown) aligned below the support head after being formed into the undulated configuration. In this situation, the final uncut lead 91 of half coil 90' would extend to the wire nozzle. Uncut lead 91 is intercepted by a hook from one of the forming members 26 at the start of the opposite rotation of the support head to form second half coil 90". The uncut lead 91 shown in FIG. 11 is then deformed to follow the undulated form of the half coils.

As the support head rotates in the opposite direction to form second half coil 90", slide 23 may be gradually moved in upward direction 23' along the coil axis to achieve the ascending order of turns 1 to 4 shown in FIG. 11. After turn 4 has been formed, final lead 90b can be drawn and cut at level L3 corresponding to turn 4, or at another level corresponding to one of the other wire turns (e.g., turns 1–3), to achieve positioning of the final lead as shown in FIG. 9. It may be advantageous to position final lead 90b at a level corresponding to one of the other turns to avoid its exposure to the radially outer contour when placed within core 10.

To summarize what is illustrated, for example, by FIGS. 9–11, a pair of half-coils 90' and 90" can be wound using wire that emanates from wire dispenser 20. The wire is continuous between the half-coils. The respective half-coils are intended for insertion in a hollow annular dynamo-electric machine core 10 with respective different angular registrations relative to a circumference of the core. A first plurality of substantially planar turns of wire 1–4 are wound on forming structure 26 starting from an initial lead 90a to produce the first half-coil 90' as shown in FIG. 10. The planes of these wire turns are perpendicular to the paper on which FIG. 10 is drawn. These planes are also parallel to the top and bottom edges of that paper. A second plurality of substantially planar turns of wire 1–4 are subsequently wound on the forming structure 26 ending with a final lead 90b to produce the second half-coil as shown in FIG. 11. The planes of these wire turns are oriented similarly to the planes mentioned earlier in this paragraph. At least one of the initial and final leads 90a and 90b is displaced out of the plane of the turn of wire from which that lead extends. In the particular example described in connection with FIGS. 9–11, the final lead 90b is displaced out of the plane of final turn 4 in FIG. 11 (e.g., by moving wire dispenser 20 down near the end of and/or after winding final turn 4 in FIG. 11). However, in another situation, initial lead 90a could be displaced more out of the plane of initial turn 1 in FIG. 10 (e.g., by moving wire dispenser 20 down farther before winding turn 1 in FIG. 10, and possibly also moving the wire dispenser to wind subsequent turns 2–4 from the bottom up rather than from the top down as shown in FIG. 10).

The lead displacement mentioned above can be produced by causing relative movement between the wire dispenser 20 and the forming structure 26 substantially perpendicular to the planes of the turns of wire mentioned in the preceding paragraph. A typical purpose for the lead displacement is to place any lead that is displaced in a position that results in that lead being at a desired location radially of core 10 when the half-coils are inserted in the core. Typically, the desired location is more centrally located between the inner and outer circumferences 10' and 10" of the core than the displaced lead would have been if it were not displaced in accordance with this invention.

Typically, each of the half-coils is substantially helical on the forming structure 26, except to the extent that results from the displacing of at least one of leads 90a and 90b. The first half-coil 90' is typically removed from the forming structure 26 (e.g., as shown in FIG. 11) prior to winding the second half-coil 90" on the forming structure. The first half-coil 90' may be wound in a first direction (e.g., clockwise) around the forming structure 26, and the second half-coil 90" may be wound in an opposite second direction (e.g., counter-clockwise) around the forming structure. A so-called reversal loop may be formed in the wire 91 extending between the first and second half-coils.

It should be understood that using the method and apparatus of the invention, it is contemplated that any number of wire coils and continuous coil portions may be formed in sequence. For example, all continuous coil portions to be placed within a component core may be formed in sequence from a continuous wire. Similarly, it is within the scope of the invention for wire coils or continuous coil portions of a sequence to be formed in parallel, or substantially simultaneously, on multiple forming platforms.

It should also be understood that using the methods and apparatus of the invention for controlling the motion of the feeding and forming apparatus relative to each other, a sequence of coils or continuous coil portions may be formed that has any combination of wire deposit directions and lead position arrangements.

It is contemplated that forming member 26, shown herein as having grippers 27 and 28, may have only one gripper configured to be positioned at an appropriate level along the coil axis for forming the initial lead.

It is also contemplated that the final lead may be formed in any angular plane around axis 24.

Thus, improved systems and methods for forming wire coils and positioning wire leads are provided. One skilled in the art will appreciate that the present invention can be practiced by other than the described embodiment, which is presented for the purpose of illustration and not of limitation. For example, although the foregoing description assumes that the forming head (of forming members 26) rotates to draw wire from the wire supply 20, the forming head could be stationary and wire supply 20 could rotate in an orbit around the forming head. And, although the foregoing descriptions assumes that the wire supply 20 translates vertically in relation to the stationary forming head, the wire supply 20 could be stationary and the forming head could translate vertically in relation to the forming head. Thus references herein and in the appended claims to rotation of the forming head will be understood to mean relative rotation of the forming head and the wire supply, and reference to the translation of the wire supply will be understood to mean relative translation of the forming head and the wire supply.

What is claimed is:

1. A method for winding coils of wire around a coil axis for depositing on a core for a dynamo-electric machine comprising:

winding a first portion of a coil around a form structure so that an early turn of the first portion is adjacent a first location along the coil axis on the form structure and so that subsequent turns are deposited on the form structure progressing in a first direction along the coil axis away from the first location;

removing the first portion of the coil from the form structure without breaking the wire extending back from a final turn of the first portion; and winding a second portion of the coil around the form structure so that successive turns of the second portion are deposited on the form structure progressing in a second direction along the coil axis that is opposite to the first direction.

2. The method of claim 1 further comprising positioning a final turn of the second portion along the coil axis substantially adjacent to the first location.

3. The method of claim 1 further comprising shaping the first portion in an undulated configuration having a plurality of radial lobes alternated with hollows positioned in angular intervals around a circumference of the first portion.

4. The method of claim 3 further comprising:

shaping the second portion in the undulated configuration; and arranging the second portion at a position angularly shifted relative to the first portion, wherein the second coil portion has lobes at the same angular positions of the hollows of the first coil portion.

5. The method of claim 4 further comprising shaping a wire portion connecting the first portion with the second portion to form a loop following an annular path matching the profile of one of the two portions for one part and the profile of a hollow of the other portion opposite to the lobe for another part.

6. A method of winding a pair of half-coils using wire that emanates from a wire dispenser and that is continuous between the half-coils, the respective half-coils being intended for insertion in a dynamo-electric machine core with respective different angular registrations relative to a circumference of the core, comprising:

winding a first plurality of substantially planar turns of wire on a forming structure starting from an initial lead to produce a first of the half-coils;

winding a second plurality of substantially planar turns of wire on the forming structure ending with a final lead to produce a second of the half-coils; and displacing at least one of the initial and final leads out of the plane of the turn of wire from which that lead extends, wherein the winding of the first half-coil is done in a first direction around the forming structure, and the winding of the second half-coil is done in a second direction around the forming structure that is opposite to the first direction.

7. A method for forming a series of coils each wound around a coil axis, for placement into a dynamo-electric machine component core, the method comprising:

sequentially forming each of the coils by winding at least one wire having an initial and final lead into wire turns that are positioned in successive, substantially parallel planes spaced along the coil axis;

controlling a sequence of directions along the coil axis for distributing the wire turns of the coils, the sequence including a first direction substantially perpendicular to the parallel planes and a second opposite direction;

positioning the final lead of each of the coils relative to the parallel planes; and programmably controlling a relationship between the sequence of distribution directions and the positions of the final leads to surround each of the initial and final leads between wire turns of radially adjacent coils when the coils are sequentially placed into the core.

8. Apparatus for forming a series of coils for placement into a dynamo-electric machine component core, the apparatus comprising:

forming structure configured to rotate about a coil axis to sequentially form each of the coils by winding at least one wire having an initial and final lead into wire turns that are positioned in successive, substantially parallel planes that are substantially perpendicular to the coil axis;

wire feeding mechanism configured to translate parallel to the axis to distribute the wire turns of the coils and to position a final lead of each of the coils relative to the parallel planes; and programmable control apparatus configured to control the translation of the feeding mechanism relative to the rotation of the forming structure to produce a series of coils wherein each of the initial and final leads is surrounded between wire turns of radially adjacent coils when the coils are sequentially placed into the core.

9. Apparatus for winding coils of wire around a coil axis for depositing on a core for a dynamo-electric machine comprising:

wire feeding mechanism configured to wind a first portion of a coil around a form structure so that an early turn of the first portion is adjacent a first location along the coil axis on the form structure and so that subsequent turns are deposited on the form structure progressing in a first direction along the coil axis away from the first location;

means for removing the first portion of the coil from the form structure without breaking the wire extending back from a final turn of the first portion; and wherein the wire feeding mechanism is further configured to wind a second portion of the coil around the form structure so that successive turns of the second portion are deposited on the form structure progressing in a second direction along the coil axis that is opposite to the first direction.

10. The apparatus of claim 9 further comprising gripper structure configured to position a final turn of the second portion along the coil axis substantially adjacent to the first location.

11. The apparatus of claim 9 further comprising forming mechanism configured to shape the first portion in an undulated configuration having a plurality of radial lobes alternated with hollows positioned in angular intervals around a circumference of the first portion.

12. The apparatus of claim 11 wherein the forming mechanism is further configured to shape the second portion in the undulated configuration and arrange the second portion at a position angularly shifted relative to the first portion, wherein the second coil portion has lobes at the same angular positions of the hollows of the first coil portion.

13. The apparatus of claim 12 wherein the forming mechanism is further configured to shape a wire portion connecting the first portion with the second portion to form a loop following an annular path matching the profile of one lobe of one of the two portions for one part and the profile of a hollow of the other portion opposite to the lobe for another part.

* * * * *